United States Patent [19]
Kravitz

[11] Patent Number: 5,735,539
[45] Date of Patent: Apr. 7, 1998

[54] TRAILER HITCH LOCKING DEVICE

[76] Inventor: Harley A. Kravitz, 3041 Brainard Rd., Pepper Pike, Ohio 44124

[21] Appl. No.: 593,183

[22] Filed: Feb. 1, 1996

[51] Int. Cl.$^6$ ........................................ B60D 1/28
[52] U.S. Cl. .................. 280/506; 280/491.2; 280/511
[58] Field of Search ........................ 280/491.1, 491.5, 280/495, 504, 506, 491.2, 482, 507; 224/521, 519, 518; 403/3, 104, 109, 362, 377, 379

[56] References Cited

U.S. PATENT DOCUMENTS

| | | |
|---|---|---|
| 5,025,932 | 6/1991 | Jay .................................. 211/20 |
| 5,181,822 | 1/1993 | Allsop et al. ................... 280/506 X |
| 5,184,840 | 2/1993 | Edwards ............................ 280/507 |
| 5,244,133 | 9/1993 | Abbott et al. . |
| 5,344,175 | 9/1994 | Speer . |
| 5,423,566 | 6/1995 | Warrington et al. . |
| 5,449,101 | 9/1995 | Van Dusen ................... 280/506 X |
| 5,593,172 | 1/1997 | Breslin ............................ 280/506 |

*Primary Examiner*—Anne Marie Boehler
*Attorney, Agent, or Firm*—Watts, Hoffmann, Fisher & Heinke Co., L.P.A.

[57] ABSTRACT

In combination with a receiver type trailer hitch having telescopically connected vehicle and received components, at least one of which is tubular, the components being maintained in telescopic relationship by a pin component extending through apertures in each of the components, a connection tightening mechanism comprising a bridge element, a spaced pair of flanges secured to and projecting from the bridge element so that the bridge element and the flanges together straddle at least one of the components, the flanges being connected to at least one of the components, and the mechanism including a spaced pair of projections each engaging a different one of the components whereby to tighten the telescopic connection.

33 Claims, 1 Drawing Sheet

U.S. Patent         Apr. 7, 1998         5,735,539
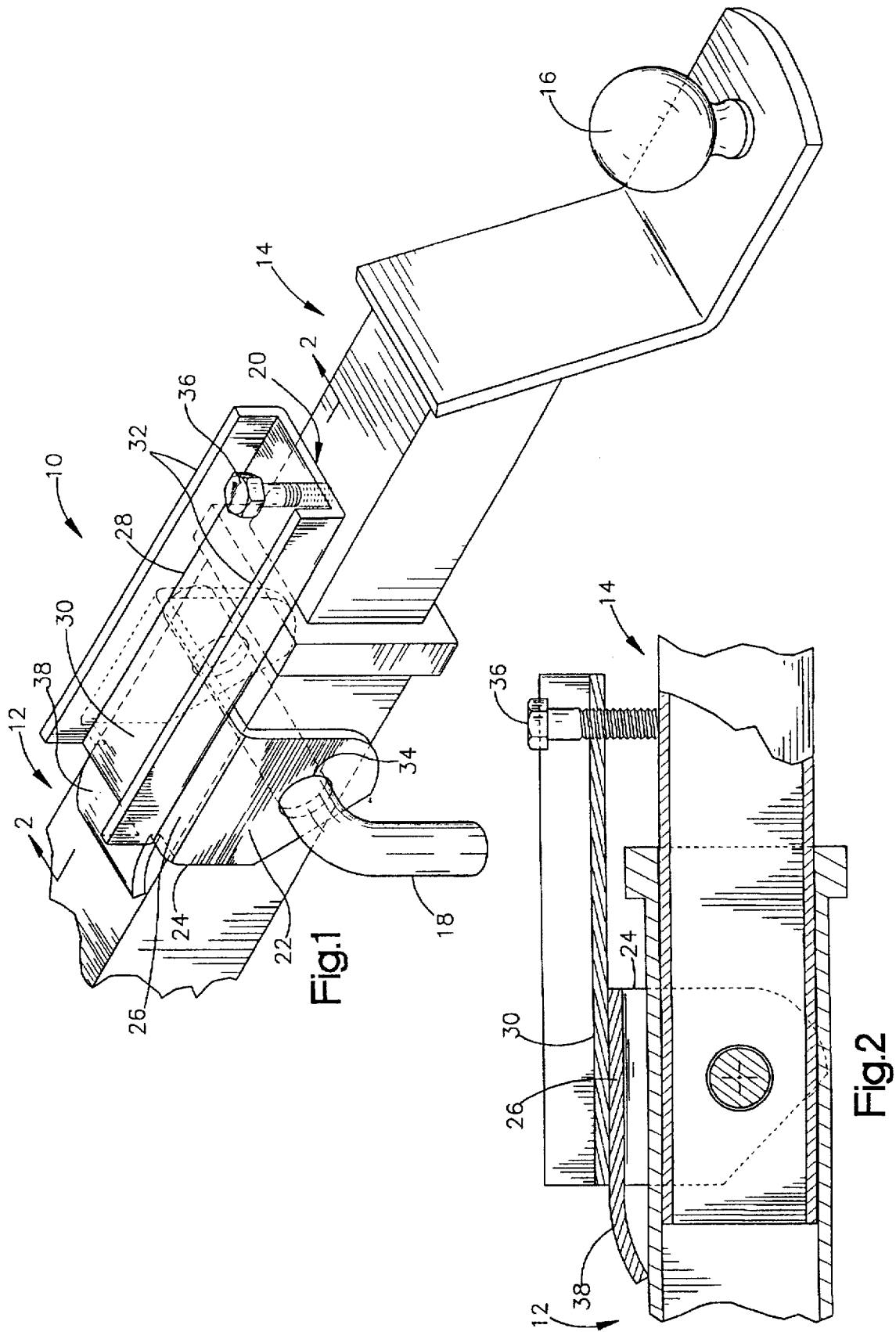

TRAILER HITCH LOCKING DEVICE

FIELD OF INVENTION

This invention relates to vehicle mounted article carriers or towing devices and more particularly to receiver type trailer hitch locking devices for reducing undesirable vibration caused by free play between the received and vehicle components of the trailer hitch.

BACKGROUND OF THE INVENTION

Receiver type trailer hitches used for towing or carrying large articles outside a vehicle are well known. A receiver hitch includes a tubular vehicle component mounted on the vehicle and a corresponding received component complementary in shape so that one end of the received component can be slid inside the vehicle component creating a telescopic relationship. The protruding end of the received component can include a carrier to enable the transport of a bicycle or other article, or it can include other connection means such as a ball to enable a trailer to be towed.

Typically a pin is employed through corresponding holes in the vehicle and received components to hold the two components together during transport or towing operations. The connection between the vehicle and received components is problematic, in that the fit between the two pieces must be loose enough to provide for their convenient engagement and disengagement, but tight enough to minimize vibration during transport or towing operations. These two competing objectives result in vibration from space between the vehicle component and the received component during transport or towing operations.

Vibration during transport or towing is undesirable for several reasons. Not only is the vibration and its associated noise distracting, but it can also result in damage to articles being carried or towed.

Several approaches have been proposed to reduce vibration with receiver type trailer hitches. For example, it has been proposed that the received component be fitted at the inserted end with a sliding wedge. After this end is slid into the vehicle component, the angled surface of the wedge is slidably drawn across the angled surface of the end of the received component until a surface of the wedge and a surface of the received component simultaneously engage opposing inner surfaces of the tubular vehicle component. This forced contact between the movable wedge, the received component and the interior surface of the vehicle component is intended to reduce vibration during transport or towing operation.

Another approach would provide for the received component to consist of upper and lower channelled pieces joined together by a hinged link. With the link in its retracted position a portion of the received component would be slid into the tubular vehicle component. The channelled pieces would then be drawn in opposing directions causing the link to move to its extended position. The extended position of the link would urge the surfaces of the two channels to simultaneously engage opposing inner surfaces of the vehicle component. This forced contact between these movable channels and the interior surface of the vehicle component is intended to reduce vibration during transport or towing operation.

Another proposal to reduce vibration with receiver type trailer hitches provides for a securing pin that engages the inner surface of the tubular vehicle component. The receiver component includes two openings on opposing walls, with one opening located on that portion of the received component within the vehicle component and the other located on the protruding end of the received component. The openings are aligned at an angle oblique to the transverse and longitudinal axes of the vehicle and received components. After a portion of the received component is slid into the tubular vehicle component, a pin is rotated through the two openings in the received component to cause the tapered end of the pin to engage an inner corner surface of the tubular vehicle component. Further tightening of the pin causes a corner of the received component within the tubular vehicle component to engage a corner of the vehicle component. This forced contact between the exterior surface of the received component and the interior surface of the tubular vehicle component reduces vibration during transport and towing operations.

While these approaches have attempted to solve the problem of receiver trailer hitch vibration, they are complex in operation and structure, requiring multiple parts and complex tooling. These complexities add to the cost of manufacture and increase the potential for malfunction. Further, these proposals are not standardized so as to be useful over a broad range of trailer hitch sizes.

SUMMARY OF THE INVENTION

The lock mechanism of the present invention uses the pin connecting the vehicle and received components as a fulcrum to tighten their connection. Two projections of the lock mechanism each apply a load on each side of the fulcrum in the same direction, with one load applied by one projection to the vehicle component and the other load applied by a second projection to the received component. The lock mechanism does not interfere with any of the typical uses for a telescopic trailer hitch; a carrier can be attached to the received component for transporting objects, or a trailer can be attached to the received component for towing operations. The lock mechanism of the present invention is utilized with a receiver type trailer hitch having a received component and a vehicle component, with at least one component tubular in construction, where the telescopic relationship between the two components is maintained by a pin projecting through the components. The lock mechanism is comprised of standard parts and can be used with a range of existing hitch sizes.

The lock mechanism is easily assembled and operated. The mechanism includes a bridge piece with two attached flanges that together straddle at least one of the received and vehicle components, and two projections spaced to each engage a different one of these components. The mechanism is connected to at least one of these components to allow the two projections to each engage a different component and thereby tighten the telescopic connection between the vehicle and received components.

In the preferred and disclosed embodiment the mechanism is pivotally connected to the received and vehicle components by the pin that maintains the vehicle and received components in telescopic relationship. The flanges are apertured and aligned such that the pin projects through the flanges as well as the vehicle and received components. Other means for pivotally connecting the mechanism to at least one of the vehicle and received components can be used.

The projections are sized and configured such that once the lock mechanism is connected to the hitch, one projection engages the vehicle component while the second projection engages the received component to tighten the telescopic connection between the vehicle and received components. Preferably, at least one of the projections is adjustable, enabling enhanced tightening. In the preferred and disclosed embodiment, one projection consists of a screw threaded through the bridge. As the screw is threaded and engages the protruding end of the received component on one side of the fulcrum, the inserted end of the received component on the other side of the fulcrum is urged against the interior surface of the tubular vehicle component. The second projection of the preferred and disclosed embodiment extends in an arcuate shape from the bridge and is urged against the vehicle component thereby tightening the telescopic connection between the vehicle and received components. It is believed that the arcuate shape of the second projection enhances the tightening of the telescopic connection between the vehicle and received components.

In another embodiment of the invention, the adjustable projection engages the vehicle component on one side of the fulcrum, while the second projection engages the received component on the other side of the fulcrum.

Accordingly, an object of the invention is to provide a novel and improved lock mechanism suitable for use with receiver type trailer hitches of varying sizes.

BRIEF DESCRIPTION OF THE DRAWINGS

FIG. 1 is a perspective view of a lock mechanism made in accordance with this invention as mounted on a receiver type trailer hitch configured for towing and using a tubular vehicle component;

FIG. 2 is a cross-sectional view of the lock mechanism of FIG. 1 as seen from the plane indicated by the line 2—2.

DETAILED DESCRIPTION OF THE PREFERRED EMBODIMENT

In the embodiment of FIG. 1 the lock mechanism 10 is mounted on a receiver type trailer hitch. The trailer hitch includes a tubular vehicle component 12 acting as a receiver element, and a received component 14 configured with a towing ball 16. The size and shape of the received component 14 complement the vehicle component 12 such that one end of the received component 14 has been slid into the vehicle component 12. The telescopic relationship between the received component 14 and the vehicle component 12 is maintained by a clevis pin 18 that projects through apertures in both components.

The lock mechanism 10 includes a bridge 20 and a spaced pair of connection flanges 22 secured to and projecting from the bridge 20. The bridge 20 depicted in FIG. 1 includes a straddle channel 24 having a straddle central portion 26. The connection flanges 22 project from the straddle central portion 26 to straddle the receiver vehicle component 12. The bridge 20 depicted in FIG. 1 further includes a bridge channel 28 having a bridge central portion 30 and a spaced pair of reinforcing flanges 32 projecting from the bridge central portion 30. The connection flanges 22 have aligned apertures 34 through which the clevis pin 18 passes. The straddle central portion 26 and the bridge central portion 30 are joined so that the connection flanges 22 and the reinforcing flanges 32 project in opposing directions. The straddle channel 24 and the bridge channel 28 are separate pieces with the bridge central portion 30 and the straddle central portion 26 preferably welded or joined by any other suitable method.

As depicted in FIG. 2, an engagement projection consisting of an adjustable screw 36, or tensioner, is threaded through the bridge central portion 30 and engages the protruding portion of the received component 14. A second arcuate engagement projection 38 extends from the straddle central portion 26 of the straddling channel 24 and engages the vehicle component.

It can be seen that when the tensioner 36 is threaded through the bridge central portion 30 to engage the protruding portion of the received component 14, the clevis pin 18 acts as a fulcrum. That portion of the received component 14 on the tensioner 36 side of the clevis pin 18 is urged in one direction causing that portion of the received component 14 on the other side of the clevis pin 18 to move in the opposing direction, against the inside surface of the vehicle component 12. At the same time, the second arcuate engagement projection 38 urges the vehicle component 12 against the received component 14. The telescopic connection between the vehicle component 12 and the received component 14 is thereupon tightened, reducing the vibration resulting from play between the two components.

Although the invention has been described in its preferred form with a certain degree of particularity, it is understood that the present disclosure of the preferred form has been made only by way of example and that numerous changes in the details of construction and the combination and arrangement of parts may be resorted to without departing from the scope or spirit of the invention as hereinafter claimed.

I claim:

1. In combination with a receiver trailer hitch having telescopically connected vehicle and received components at least one of which is tubular, the components being maintained in telescopic relationship by a pin component extending through apertures in each of the components, a connection tightening mechanism comprising:

a) a bridge element;
   b) a spaced pair of apertured flanges secured to and projecting from the bridge element so that the bridge element and the flanges together straddle at least one of the components;
   c) the pin also extending through the flange apertures to pivotally connect the bridge element to the components; and
   d) the mechanism including a spaced pair of projections each engaging a different one of the components at least one of the projections being adjustable whereby to tighten the telescopic connection.

2. The combination of claim 1 wherein at least one of the projections is adjustable.

3. The combination of claim 2 wherein the one projection is a threaded element in threaded engagement with the bridge element.

4. The combination of claim 2 wherein the flanges are portions of a channel and the other of the projections is an arcuate extension projecting from the channel.

5. The combination of claim 3 wherein the flanges are portions of a channel and the other of the projections is an arcuate extension projecting from the channel.

6. The combination of claim 1 wherein said at least one projection is a threaded element in threaded engagement with the bridge element.

7. The combination of claim 6 wherein the flanges are portions of a channel and the other of the projections is an arcuate extension projecting from the channel.

8. The combination of claim 1 wherein the flanges are portions of a channel and at least one of the projections is an arcuate extension projecting from the channel.

9. In combination with a receiver trailer hitch having telescopically connected vehicle and received components at least one of which is tubular, the components being maintained in telescopic relationship by a pin component extending through apertures in each of the components, a connection tightening mechanism comprising:

a) a bridge element;

b) a channel including a spaced pair of flanges, the channel being secured to the bridge element with the flanges projecting from the bridge element so that the bridge element and the flanges together straddle at least one of the components;

c) the flanges being connected to at least one of the components; and d) the mechanism including a spaced pair of projections, one of the projections being arcuate, each of the projections engaging a different one of the components whereby to tighten the telescopic connection.

10. The combination of claim 9 wherein the mechanism is pivotally connected to at least one of the components.

11. The combination of claim 10 wherein the pin pivotally connects the mechanism to the components through apertures in the flanges aligned with the apertures in each of the components.

12. The combination of claim 11 wherein the arcuate projection projects from the channel.

13. A tensioning device for tensioning a connection between telescopically connected vehicle and received components of a receiver trailer hitch comprising:

a) a bridge element, said bridge element further comprising: a straddle channel having a straddle central portion and spaced connection flanges projecting from a first side of the straddle central portion for straddling such a vehicle component; the connection flanges having aligned apertures for receiving a clevis pin for securing the device to the vehicle and received components and maintaining such telescopic connection; a bridge channel having a bridge central portion and spaced reinforcing flanges; the flanges of the central portions projecting oppositely such that when in use, the connection flanges are on either side of the vehicle component and the reinforcing flanges project away from such vehicle component; and one of the central portions including an engagement projection extending from said one central portion to engage one of such components; and b) an adjustable tensioner element carried by a first of the central portions for engagement with the other of the components whereby when in use the pin is a fulcrum and the engagement projection and tensioner act against both components to tighten the telescopic connection.

14. The device of claim 13 wherein the straddle channel and the bridge channel are discrete components with the straddle central portion and the bridge central portion joined together.

15. The device of claim 13 wherein the engagement projection is arcuate in shape.

16. The device of claim 14 wherein the engagement projection is arcuate in shape.

17. The device of claim 13 wherein said first central portion is the bridge central portion.

18. The device of claim 14 wherein said first central portion is the bridge central portion.

19. The device of claim 15 wherein said first central portion is the bridge central portion.

20. The device of claim 16 wherein said first central portion is the bridge central portion.

21. The device of claim 13 wherein said one central portion is the straddle central portion.

22. The device of claim 14 wherein said one central portion is the straddle central portion.

23. The device of claim 15 wherein said one central portion is the straddle central portion.

24. The device of claim 17 wherein said one central portion is the straddle central portion.

25. The device of claim 20 wherein said one central portion is the straddle central portion.

26. The device of claim 18 wherein said one central portion is the straddle central portion.

27. The device of claim 19 wherein said one central portion is the straddle central portion.

28. The device of claim 16 wherein said one central portion is the straddle central portion.

29. A tensioning device for tensioning a connection between telescopically connected vehicle and received components of a receiver trailer hitch comprising:

a) a bridge mechanism, said bridge mechanism further comprising:

i) a straddle channel having a straddle central portion and spaced connection flanges projecting from a first side of the straddle central portion for straddling such a vehicle component; the connection flanges having aligned apertures for receiving a clevis pin for securing the device to the vehicle and received components and maintaining such telescopic connection; and, ii) a bridge element having a bridge central portion;

b) one of the central portions including an engagement projection extending from said one central portion to engage one of such components; and c) an adjustable tensioner element carried by a selected one of the central portions for engagement with the other of such components whereby when in use the pin is a fulcrum and the engagement projection and tensioner act against both components to tighten the telescopic connection.

30. The device of claim 29 wherein the straddle channel and the bridge element are discrete components with the straddle central portion and the bridge central portion joined together.

31. The device of claim 29 wherein the engagement projection is arcuate in shape.

32. The device of claim 29 wherein said first central portion is the bridge central portion.

33. The device of claim 29 wherein said one central portion is the straddle central portion.

* * * * *